(12) United States Patent
Berliner et al.

(10) Patent No.: US 11,889,348 B2
(45) Date of Patent: Jan. 30, 2024

(54) TECHNIQUES FOR COMPRESSING FEEDBACK VALUES IN WIRELESS COMMUNICATIONS

(71) Applicant: QUALCOMM Incorporated, San Diego, CA (US)

(72) Inventors: Ran Berliner, Kfar Aviv (IL); Yehonatan Dallal, Kfar Saba (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/180,187

(22) Filed: Feb. 19, 2021

(65) Prior Publication Data

US 2022/0272569 A1 Aug. 25, 2022

(51) Int. Cl.
*H04W 28/06* (2009.01)
(52) U.S. Cl.
CPC .................................. *H04W 28/06* (2013.01)
(58) Field of Classification Search
CPC ..... H04W 28/06; H04L 1/1614; H04L 1/1896
See application file for complete search history.

(56) References Cited

U.S. PATENT DOCUMENTS

| | | | |
|---|---|---|---|
| 11,069,082 B1* | 7/2021 | Ebrahimi Afrouzi .. | H04N 23/56 |
| 2010/0180046 A1* | 7/2010 | Sebastian ............... | H04B 7/185 |
| | | | 709/234 |
| 2015/0085876 A1* | 3/2015 | Chhatriwala ......... | H04W 28/06 |
| | | | 370/465 |
| 2015/0199367 A1* | 7/2015 | Hammer ............. | G06F 16/1748 |
| | | | 707/654 |
| 2016/0329995 A1* | 11/2016 | Jiang ........................ | H04L 5/14 |
| 2017/0126845 A1* | 5/2017 | Pole ....................... | H04L 43/16 |
| 2017/0257796 A1* | 9/2017 | Hsu ......................... | H04L 69/04 |
| 2019/0387382 A1* | 12/2019 | Wojcieszak ............. | H04W 4/80 |
| 2020/0084004 A1* | 3/2020 | Wang .................... | H04L 5/0091 |
| 2020/0295878 A1* | 9/2020 | Choi ................. | H04W 72/1273 |
| 2021/0352527 A1* | 11/2021 | Sridharan ................ | H04L 1/08 |

* cited by examiner

*Primary Examiner* — Syed Ali
(74) *Attorney, Agent, or Firm* — ArentFox Schiff LLP

(57) ABSTRACT

Aspects described herein relate to receiving a configuration including one or more parameters related to compressing feedback values for multiple code blocks, performing, using a compression method and an associated codebook that are selected using the one or more parameters, a compression of multiple feedback values for a set of code blocks received from a network device into a compressed feedback value, and transmitting, to the network device and using the compressed feedback value, compressed feedback for the set of code blocks.

27 Claims, 8 Drawing Sheets

TECHNIQUES FOR COMPRESSING FEEDBACK VALUES IN WIRELESS COMMUNICATIONS

BACKGROUND

Aspects of the present disclosure relate generally to wireless communication systems, and more particularly, to compressing feedback values for received wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, as transmission throughput increases, so can an amount of feedback to be communicated for received wireless transmissions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the transceiver and the memory. The one or more processors are configured to receive a configuration including one or more parameters related to compressing feedback values for multiple code blocks, perform, using a compression method and an associated codebook that are selected using the one or more parameters, a compression of multiple feedback values for a set of code blocks received from a network device into a compressed feedback value, and transmit, to the network device and using the compressed feedback value, compressed feedback for the set of code blocks.

In another aspect, a method of wireless communication is provided. The method includes receiving a configuration including one or more parameters related to compressing feedback values for multiple code blocks, performing, using a compression method and an associated codebook that are selected using the one or more parameters, a compression of multiple feedback values for a set of code blocks received from a network device into a compressed feedback value, and transmitting, to the network device and using the compressed feedback value, compressed feedback for the set of code blocks.

According to another aspect, an apparatus for wireless communication is provided that includes a transceiver, a memory configured to store instructions, and one or more processors communicatively coupled with the transceiver and the memory. The one or more processors are configured to transmit a configuration including one or more parameters related to compressing feedback values for multiple code blocks, receive, from a device, compressed feedback for a set of code blocks based on a compressed feedback value, and perform, based on a compression method and an associated codebook that are selected using the one or more parameters, a decompression of the compressed feedback value to obtain, for the set of code blocks, multiple feedback values.

In another aspect, a method for wireless communication is provided. The method includes transmitting a configuration including one or more parameters related to compressing feedback values for multiple code blocks, receiving, from a device, compressed feedback for a set of code blocks based on a compressed feedback value, and performing, based on a compression method and an associated codebook that are selected using the one or more parameters, a decompression of the compressed feedback value to obtain, for the set of code blocks, multiple feedback values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
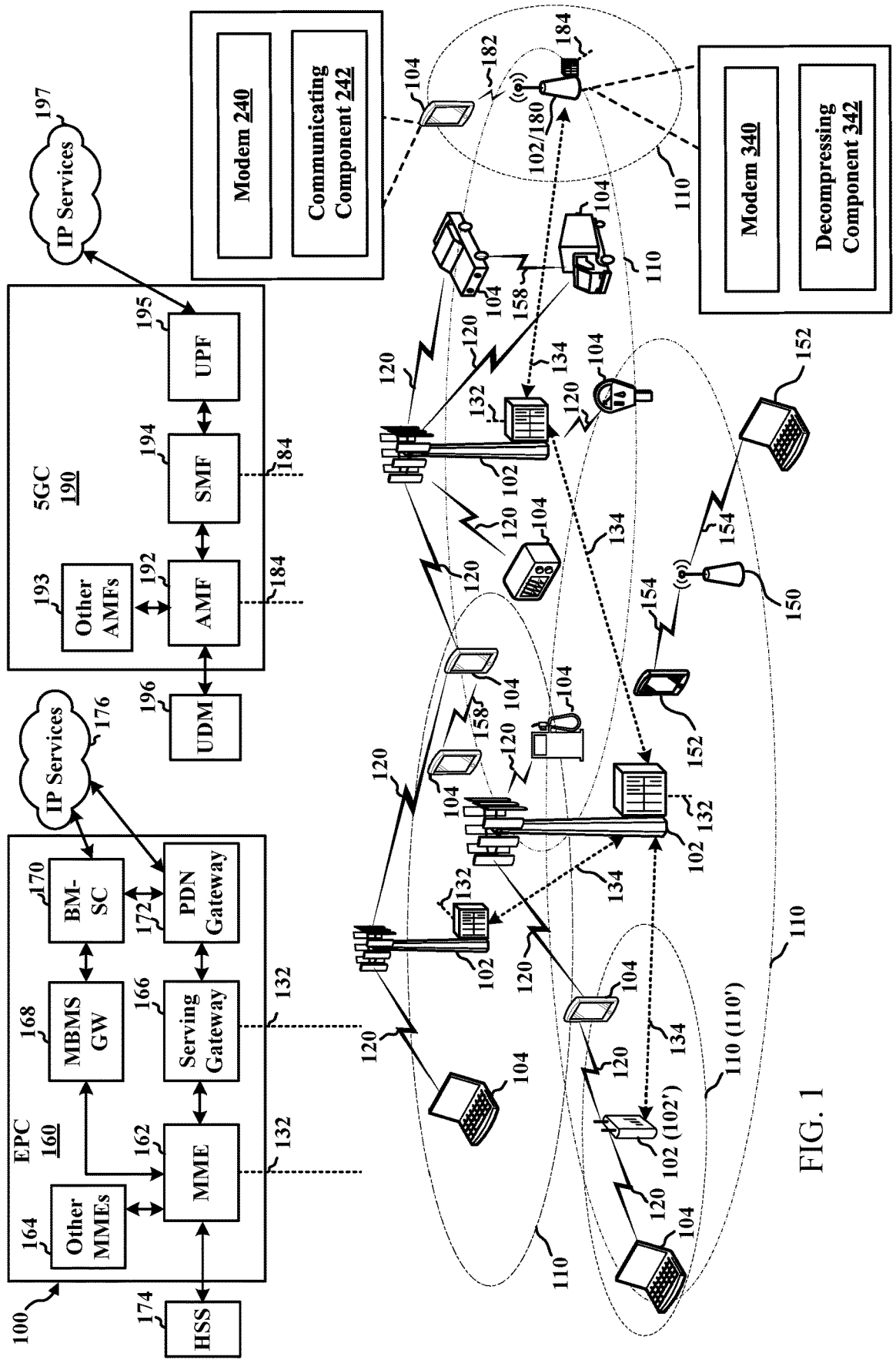
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to compressing feedback values for multiple received transmissions in wireless communications. As transmission throughput increases for wireless communications, feedback values to transmit for each of multiple received transmissions may increase as well. Accordingly, feedback values for multiple received transmissions can be compressed using substantially any compression scheme, such as a lossless compression scheme, to reduce the number of bits used to transmit the feedback values for multiple received transmissions. This can be beneficial in many scenarios. Some specific scenarios are described below and further herein; however, these examples are not exhaustive, and the concepts described herein can be applied in many different scenarios to reduce a number of bits used in transmitting feedback values, thus also reducing required bandwidth for transmitting the feedback values, etc.

For example, in fifth generation (5G) new radio (NR), frequency range (FR) 2 (FR2) is based on narrow directional analog beams (phased array). Higher bands (e.g. FR4 and FR5) may utilize significantly narrower beams to overcome the additional path loss that comes from using higher frequency carriers. As the beams become narrow, the spatial separation between the beams improves. Smart beam selection can allow massive multiple-input multiple-output (MIMO) using spatial division multiplexing (SDM) with much lower interference between the beams, compared with lower bands. sub-THz technologies like lens antennas can allow the gNB to transmit multiple beams from the same panel. Thus, instead of having multi-transmission/reception point (TRP) from different panels, higher bands can have also multi-TRP from the same panel.

The resulting multiple simultaneous (or otherwise near in time) received individual streams (stream per beam), can introduce a tremendous number of simultaneously received transport blocks. The 5G NR hybrid automatic repeat/request (HARQ) feedback is conveyed by a user equipment (UE) on single uplink control information (UCI), encapsulating acknowledgement (ACK)/negative-ACK (NACK) feedback indications for all transport blocks (TBs) that coincide to simultaneous (or otherwise near in time) received individual streams. In an example, the TBs can be part of or can form a transmission time interval (TTI), which can be defined in a wireless communication technology to be of a specific duration (e.g., a symbol, such as an orthogonal frequency division multiplexing (OFDM) symbol, or number of symbols, a slot of symbols or a number of slots, etc.).

In an example, the feedback indications may include feedback for each code block (CB) or CB group (CBG) in the TB and/or may also include feedback for semi-persistent scheduling (SPS) communications (e.g., physical downlink control channel (PDCCH) SPS). Consequently, the 5G NR HARQ feedback payload for higher bands may increase significantly compared to FR2. Having much larger HARQ-feedback payload for higher bands can require more uplink (UL) resources and consequently higher UL power (or using other methods, e.g. TB repetition) for maintaining UCI reliability. Thus, reducing the higher band HARQ feedback payload size, such as by using compression described herein, may be desired for the interest of achieving higher UCI reliability in this use case.

In addition, for example in 5G NR, large TB sizes are introduced, which are segmented into multiple CBs. In case of TB cyclic redundancy check (CRC) failure, retransmitting the failed CBs may possibly enable higher code rate per CB, lower resources occupancy and higher cell efficiency. For enhancing the ACK/NACK feedback to be of CB resolution, while conveying huge number of CBs with reasonable HARQ feedback payload size, 5G NR allows usage of CBGs, where multiple CBs ACK/NACK indications can be grouped into a single bit, forming a CBG for the purposes of indicating feedback for multiple CBs at coarse granularity than for indicating feedback of each CB. Usage of CBGs, while having some benefits, may also lack resolution. For example, CBG capacity reduction can be ⅛ (e.g., when all NACKs are located at same CBG, and there are 8 CBG). In worst case, sparse CB NACKs may reside in different CBGs, resulting in most of the TB being retransmitting. In addition, for example, CBG may introduce a fixed payload size per TB, thus proportional to the number of reported TBs per HARQ-feedback. For higher band with multiple stream with multiple TBs per TTI, the HARQ may increase such that CBG-based HARQ payload size may be problematic, and thus CBG resolution may be greatly minimized. Thus, reducing the higher band HARQ feedback payload size, such as by using compression described herein, may break the proportionality of number of reported TB and HARQ payload size (for high number of TBs) and/or may keep the highest HARQ resolution possible (e.g., CB resolution) with reasonable payload size.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for compressing feedback for transmissions (e.g., CBs in the transmissions) received from another node, such as a base station 102, in accordance with aspects described herein. In addition, some nodes may have a modem 340 and decompressing component 342 for decompressing feedback for multiple transmissions (e.g., CBs in the transmissions), in accordance with aspects described herein. Though a UE 104 is shown as having the modem 240 and communicating component 242 and a base station 102/gNB 180 is shown as having the modem 340 and decompressing component 342, this is one illustrative example, and substantially any node or type of node may include a modem 240 and communicating component 242 and/or a modem 340 and decompressing component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can receive transmissions from one or more nodes in a wireless network, such as from a base station 102, and can compress feedback values for multiple transmissions (e.g., CBs in the transmissions) received such to lower overhead associated with transmitting the feedback values. In an example, communicating component 242 can compress the feedback values based on a size of the payload of feedback to be transmitted, based on a size of the compressed feedback value, based on a configuration received from the base station 102, etc. In an example, decompressing component 342 can transmit a configuration to the UE 104 indicating one or more parameters for compressing the feedback, such as a compression method or type to use, an associated codebook for performing the compression, a threshold payload size for which to perform the compression, etc. Communicating component 242 can receive the configuration, in one example, and can perform compression of feedback values based at least in part on the configuration.

Figure 2:
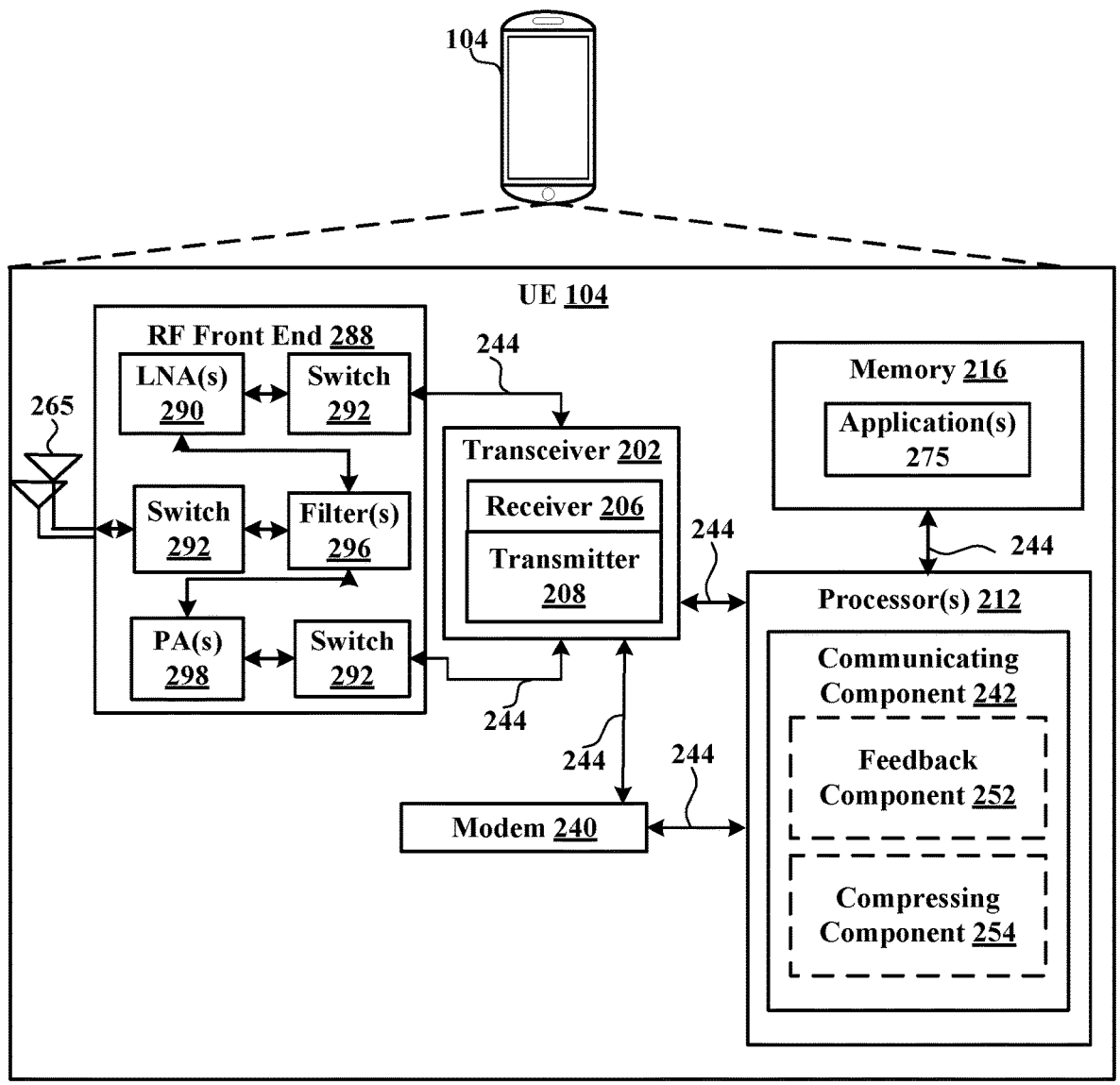
FIG. 2 is a block diagram illustrating an example of a UE, in accordance with various aspects of the present disclosure.
Figure 3:
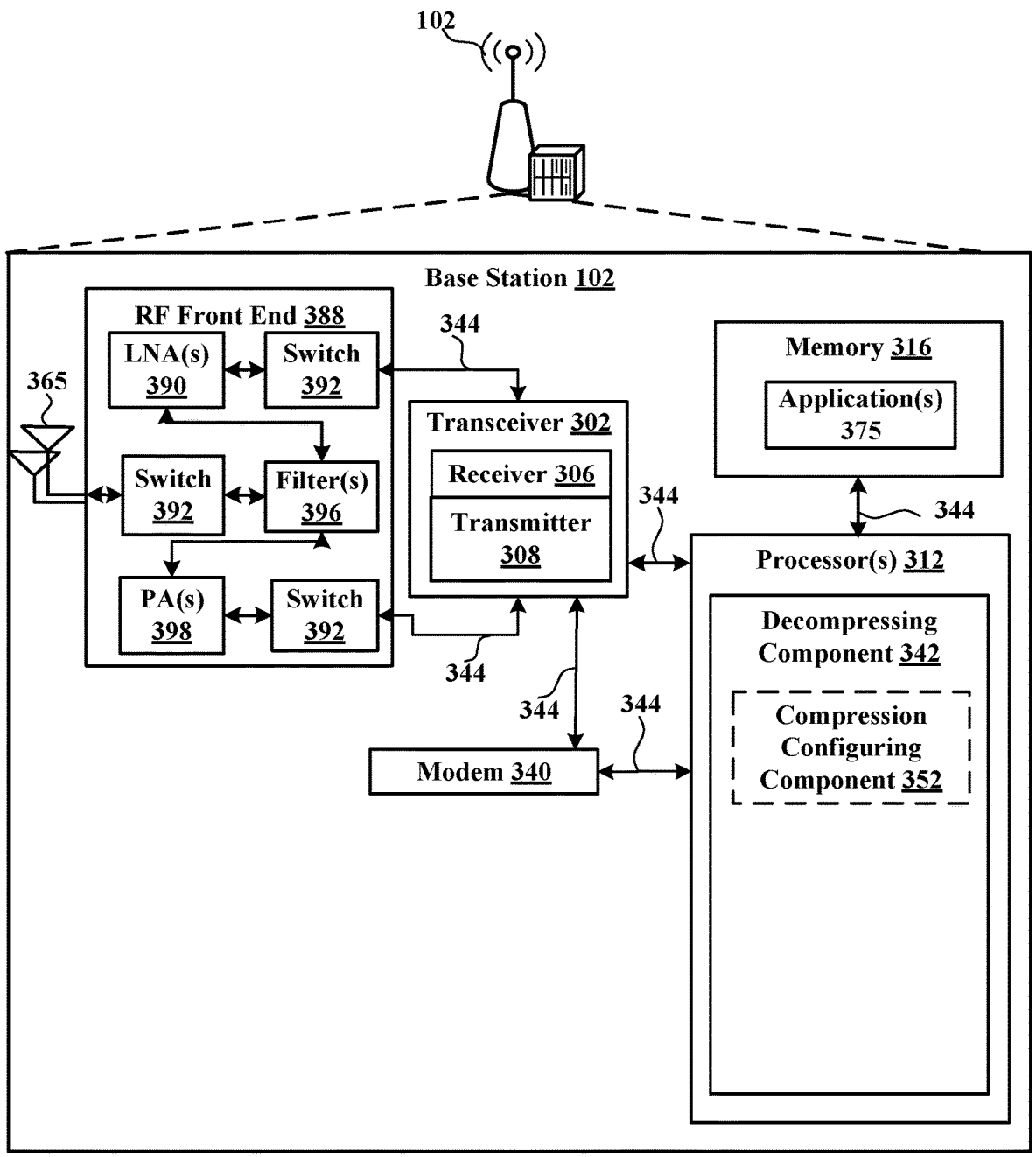
FIG. 3 is a block diagram illustrating an example of a base station, in accordance with various aspects of the present disclosure.
Figure 4:
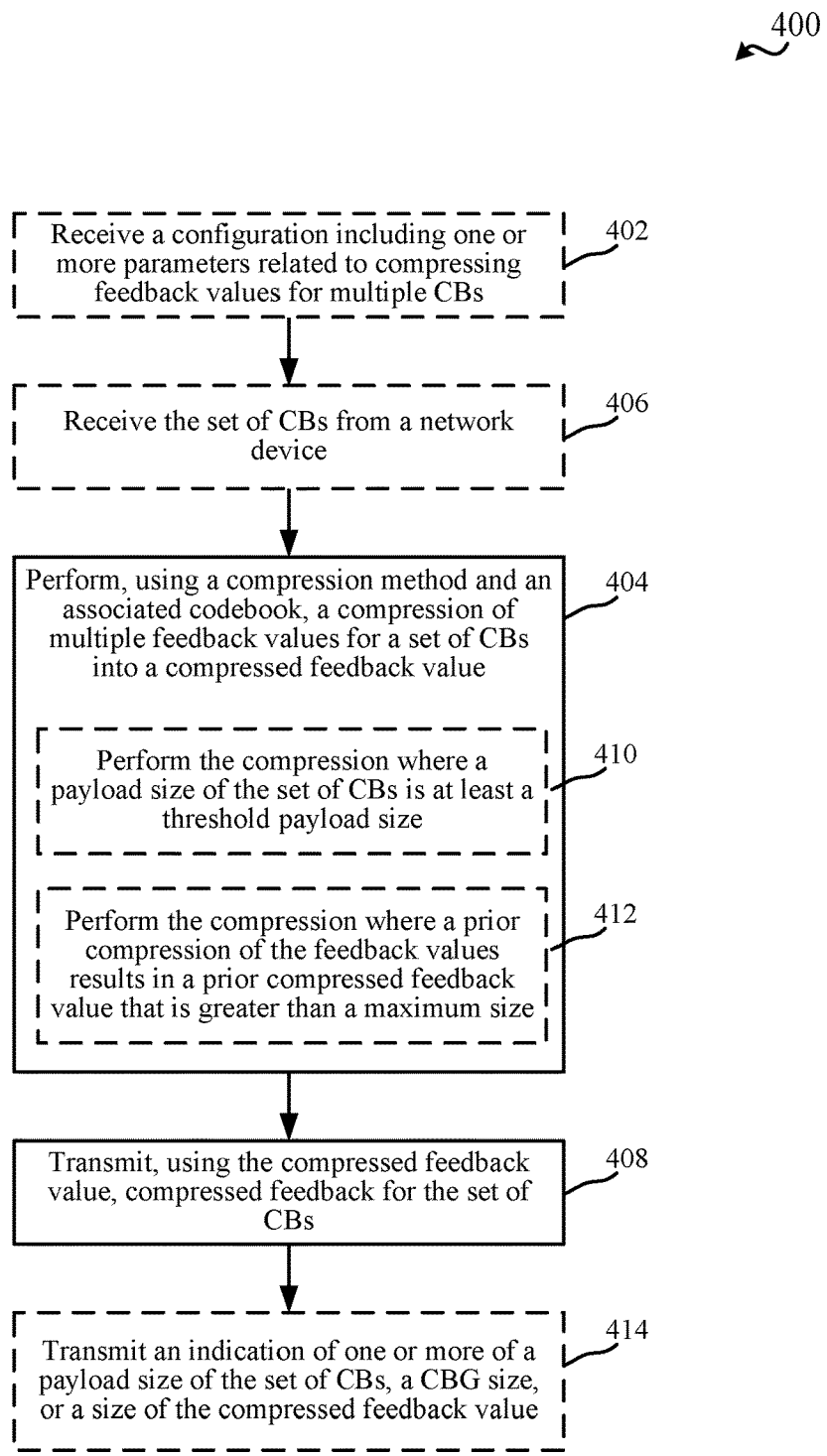
FIG. 4 is a flow chart illustrating an example of a method for compressing feedback values, in accordance with aspects described herein.
Figure 5:
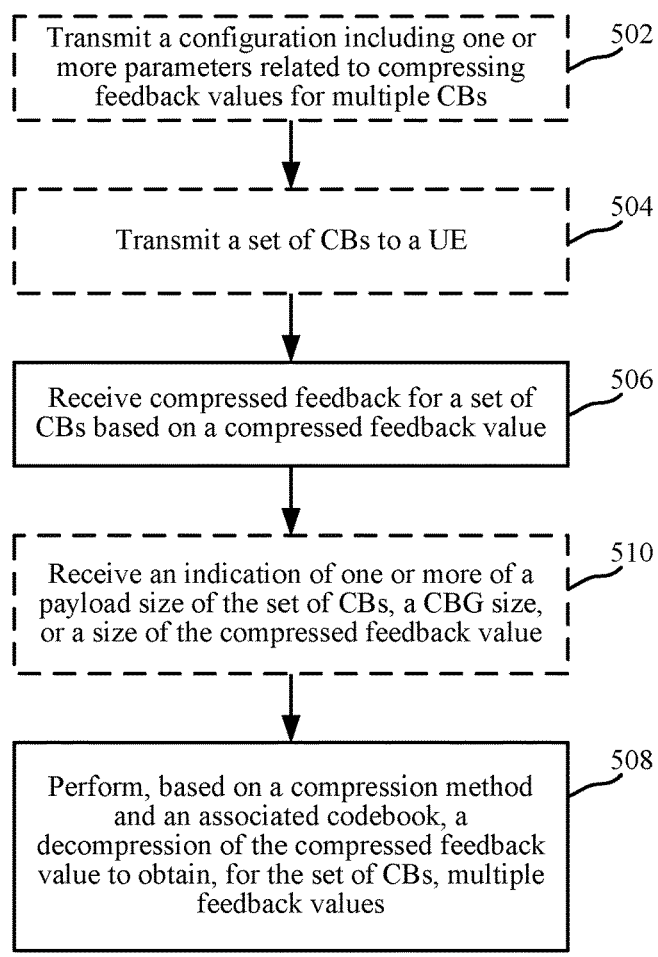
FIG. 5 is a flow chart illustrating an example of a method for decompressing feedback values, in accordance with aspects described herein.

Turning now to FIGS. 2-8, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for compressing feedback for transmissions (e.g., CBs in the transmissions) received from another node, such as a base station 102, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a feedback component 252 for determining feedback values related to receiving multiple transmissions (e.g., as CBs, CBGs, or other transmissions), and/or a compressing component 254 for compressing the feedback values into a lesser number of values or bits for transmitting compressed feedback for the multiple transmissions, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and decompressing component 342 for decompressing feedback for multiple transmissions (e.g., CBs in the transmissions), in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, decompressing component 342 can optionally include a compression configuring component 352 for configuring one or more devices to perform compression of feedback values related to receiving multiple transmissions (e.g., as CBs, CBGs, or other transmissions), in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for compressing feedback values, in accordance with aspects described herein. In an example, a UE 104 can perform the functions described in method 400 using one or more of the components described in FIGS. 1-2.

In method 400, optionally at Block 402, a configuration including one or more parameters related to compressing feedback values for multiple CBs can be received. In an aspect, feedback component 252, e.g., in conjunction with processor(s) 212, memory 216, transceiver 202, communicating component 242, etc., can receive the configuration including the one or more parameters related to compressing feedback values for multiple CBs. For example, feedback component 252 can receive the configuration from a base station (e.g., base station 102) or other node, which may be or may include a node that transmit CBs to the UE 104, for which feedback is expected. In an example, feedback component 252 can receive the configuration in radio resource control (RRC) layer signaling from the base station 102, in a media access control (MAC) control element (CE), in dedicated control signaling (e.g., received over PDCCH), and/or the like. For example, the configuration may indicate the one or more parameters related to performing compression, such as a compression method to use, which may include a lossless compression (e.g., Huffman coding, variable length coding (VLC), etc.), a codebook to use in performing the compression, a threshold payload size for which to perform compression of feedback values, a maximum compressed feedback value size, a CBG configuration for determining feedback values for CBGs, etc. In another example, the UE 104 may not receive the configuration from the base station 102 (or may receive a portion thereof from the base station 102) and can determine or obtain the configuration (or portion thereof) or related parameters from memory 216 based on implementation of the UE 104 according to a wireless communication technology, etc.

In method 400, at Block 404, a compression of multiple feedback values for a set of CBs into a compressed feedback value can be performed using a compression method and an associated codebook. In an aspect, compressing component 254, e.g., in conjunction with processor(s) 212, memory 216, transceiver 202, communicating component 242, etc., can perform, using the compression method and the associated codebook, the compression of multiple feedback values for a set of CBs into a compressed feedback value. In an example, compressing component 254 can select or determine the compression method or the associated codebook based on the one or more parameters received in the configuration (e.g., at Block 402). In one example, compressing component 254 can determine the compression method or the associated codebook based on the one or more parameters and properties of the feedback values to be compressed, as described further herein. Moreover, in an example, the set of CBs can correspond to CBs of multiple transmissions received from a base station.

In an example, optionally at Block 406, the set of CBs can be received from a network device. In an aspect, communicating component 242, e.g., in conjunction with processor(s) 212, memory 216, transceiver 202, etc., can receive the set of CBs from the network device. For example, communicating component 242 can receive the set of CBs in multiple transmissions from the network device (e.g., a base station 102) and/or other devices, antenna panels of the network device, TRPs of the network device, etc. In addition, for example, communicating component 242 can receive the set of CBs in each of multiple beams from one or more antenna panels or TRPs of the network device, etc. In any case, feedback component 252 can determine feedback values related to receiving the set of CBs, which may include a feedback value (e.g., ACK or NACK in HARQ feedback) for each of the set of CBs. As described herein, compressing component 254 can compress feedback bits into a compressed feedback value (e.g., using a lossless feedback mechanism) for optimized transmission of the feedback values. An example of feedback values for multiple CBs is shown in FIG. 6.

Figure 6:
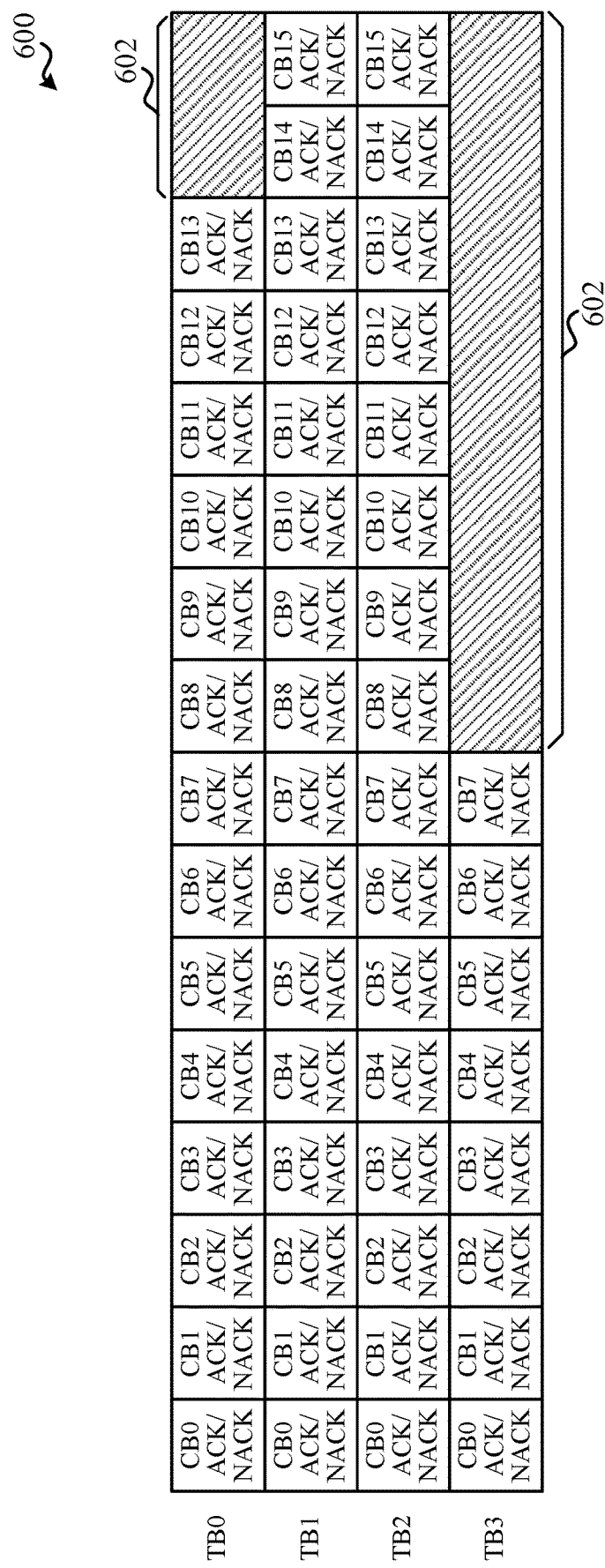
FIG. 6 illustrates an example of a binary map of feedback for multiple code blocks (CBs) transmitted in multiple transport blocks (TBs), in accordance with aspects described herein.

FIG. 6 illustrates an example of a binary map 600 of ACK/NACK feedback for multiple CBs transmitted in multiple TBs. Binary map 600 includes ACK/NACK feedback for various CBs in multiple TBs (TB0, TB1, TB2, TB3). In one example, the multiple TBs can include or can be a part of for form a TTI within which the wireless communications having the CBs and/or TBs are received. In an example, the UE 104 can receive the multiple TBs via multiple transmissions from the base station 102 and can determine to transmit feedback for the multiple TBs in a single feedback message (e.g., using a single UCI transmission to the base station 102). In the depicted example, TB0 can have 14 transmitted/received CBs (CB0-CB3), TB1 and TB2 can each have 16 transmitted/received CBs (CB0-CB15), and TB3 can have 8 transmitted/received CBs (CB0-CB7). The UE 104 can generate the binary map 600 to include multiple bits of ACK/NACK feedback for the various CBs (e.g., ACK or NACK for each CB, which may be represented by a bit indicating ACK or NACK).

For example, in a multi-stream connection with a base station 102 and/or one or more other network devices, HARQ feedback payload that UE 104 generates can include a few TBs per TTI, as shown in the binary map 600. It may be expected that communications have a certain success rate, and the binary map 600 may have sparse NACKs. The binary map can have one dimension (e.g., horizontal) representing the CBs ACK/NACK per TB, and another dimension (e.g., vertical) representing the number of TBs per TTI, as described. The CB NACK sparsity may be assumed due to an expected work point of 10% block error rate (BLER). For this reason, a binary lossless compression method can be used to reduce a number of bits used for large HARQ feedback. Binary compression can introduce excellent compression rates in sparse matrixes, and thus can result in reduction of bits needed to communicate feedback for multiple CBs of multiple TBs. In examples described herein, compressing component 254 can use one or more of these binary compression methods to compress feedback values for multiple CBs that are simultaneously (or near in time) received from a base station 102 and/or other network components. Examples of binary compression can include VLC, arithmetic coding, Huffman coding, etc. In addition, in an example, compressing component 254 can perform compression of feedback values that are in a binary map (such as binary map 600) using one or more of the following options: Option 1: one-dimensional compression by concatenating all code blocks ACK/NACK, or Option 2: two-dimensional compression of a square matrix. For this purpose, lines having less than a threshold number of CBs (e.g., 16 CBs in binary map 600) can be padded miscellaneous values (e.g., 0's or 1's) to be the of same length, as shown by the dashed line areas at 602. This can increase the compression efficiency. An example of compressing feedback values for multiple CBs is shown in FIG. 7.

Figure 7:
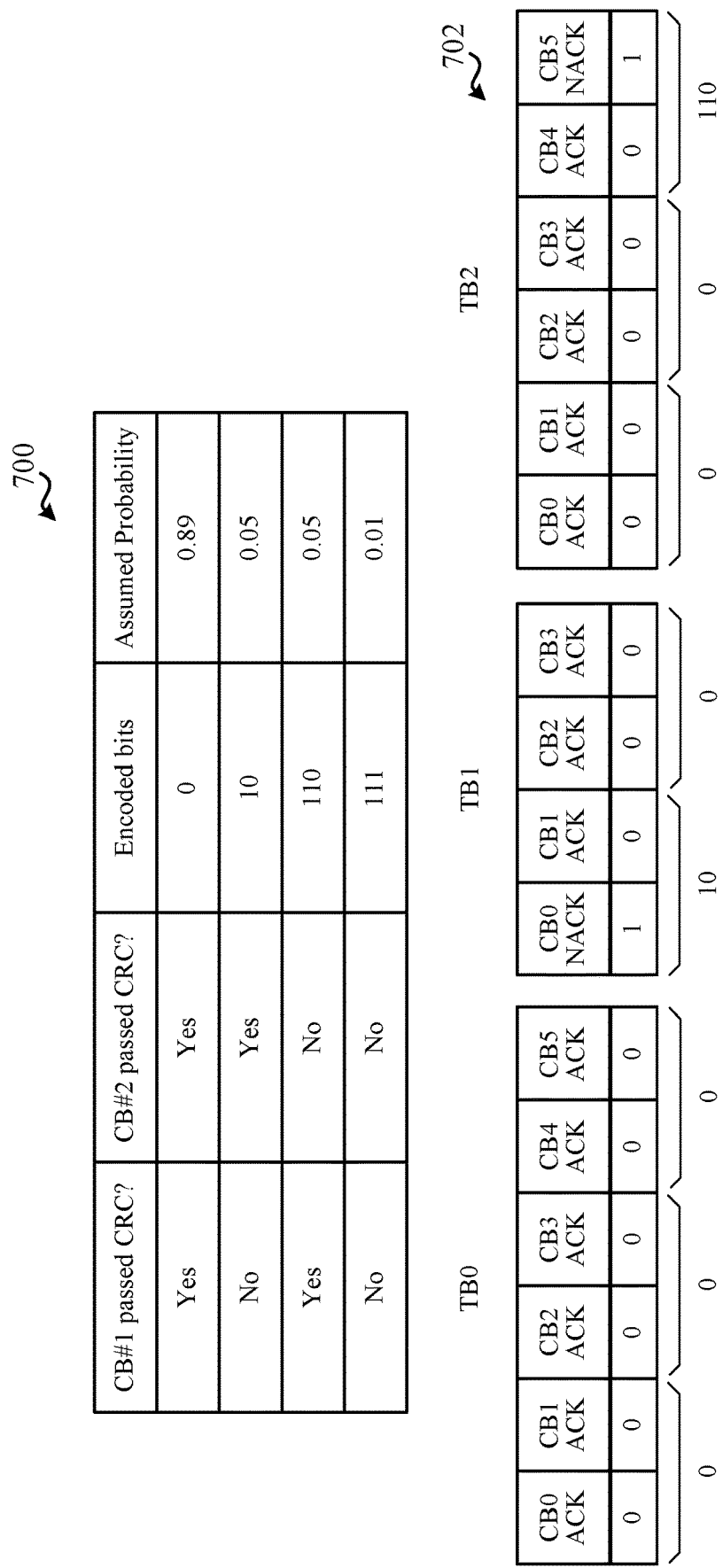
FIG. 7 illustrates an example of a codebook and compression using a Huffman coding, in accordance with aspects described herein.

FIG. 7 illustrates an example of using a Huffman coding to compress ACK/NACK feedback bits for multiple CBs into a lower number of bits. Parameters related to an associated codebook as shown at 700. For example, the ACK/NACK feedback can be based on whether a CRC performed on the received CB passed or not. Feedback for CRC for multiple CBs (e.g., 2 CBs, as shown in FIG. 7 at 700) can be combined to generate one feedback value, which can be of one or more bits. The case where both CRCs passed, the encoded bit can be a single '0.' This case can be assumed to occur with a probability around 0.89 (e.g., for 10% BLER), and thus using the single 0 to encode two feedback values (both ACKs) can save one bit for each pair of feedback values. Feedback for other CRC values can use additional bits to differentiate that feedback, such as encoded bits '10' for CRC of CB1 not passing (NACK) and CRC of CB2 passing (ACK), encoded bits '110' for CRC of CB1 passing (ACK) and CRC of CB2 not passing (NACK), or encoded bits '111' for neither CRC passing. The assumed probabilities for each case are shown, in one example, and thus using a single bit in 89% of the cases can provide an overall reduction (compression) in the number of bits used for indicating feedback for the multiple CBs.

Using this codebook 700, for example, compressing component 254 can compress the feedback shown at 702 for TB0 (CB0-CB5), TB1 (CB0-CB3), and TB2 (CB0-CB5). In this example, compressing component 254 can take the CB ACK/NACK feedback values as a one-dimensional block by concatenating feedback for the code blocks, and can compress the feedback values from '00000100000001' for each CB to '00010000110' as a compressed feedback value. Thus, 16 bits can be compressed to 11 bits, in this example using Huffman coding.

In the above examples, compression is shown for CBs. Similar concepts can be applied for compressing feedback values for CBGs where CBGs are configured. For example, a maximum number of CBGs for which to report feedback values can be configured (e.g., in the configuration received in Block 402 or otherwise). Where feedback component 252 determines that the number of CBs for which to report feedback exceeds the maximum number of CBGs, feedback component 252 can combine CBs into CBGs to result in a number of feedback values that is at or below the maximum number of CBGs. In an example, combining feedback values for CBs can include selecting ACK where ACK is to be reported for all CBs in the CBG, or selecting NACK where NACK is to be reported for at least one CB in the CBG. Once feedback values are generated for the CBGs, compressing component 254 can similarly perform compression of the feedback values for the CBGs into a compressed feedback value for transmitting feedback.

In an example, compressing component 254 can perform compression of the feedback values based on one or more parameters received from the base station 102 (e.g., received in the configuration at Block 402). The one or more parameters may indicate the compression method to use (e.g., Huffman coding, VLC, arithmetic coding, etc.), the associated codebook to use (e.g., codebook 700), a threshold payload size of feedback values for which to use compression (e.g., or for which to use one or more specific compression methods), a maximum size for the compressed feedback value, CBG configuration information for possibly reporting feedback for CBGs of the CBs, an indication of whether to use a one-dimensional (e.g., option 1 above) or two-dimensional (e.g., option 2 above) binary map in performing the compression, etc. In this regard, the base station 102, based on receiving the compressed feedback value, can determine how to decompress the compressed feedback value for determining feedback for specific CBs. For example, compressing component 254 can determine or select a compression method based on the one or more parameters, determine or select an associated codebook based on the one or more parameters, determine or select an option for arranging the feedback values for compression (e.g., as a one-dimensional or two-dimensional binary map), etc., and can accordingly perform the compression based on the determination(s) and/or selection(s).

In method 400, at Block 408, compressed feedback for the set of CBs can be transmitted using the compressed feedback value. In an aspect, feedback component 252, e.g., in conjunction with processor(s) 212, memory 216, transceiver 202, communicating component 242, etc., can transmit, using the compressed feedback value, compressed feedback for the set of CBs. In an example, feedback component 252 can transmit the compressed feedback value, or a value that is based on the compressed feedback value. In addition, for example, feedback component 252 can transmit the compressed feedback to a base station 102 or one or more other nodes from which the CBs related to the feedback are received. In an example, feedback component 252 can transmit the compressed feedback in UCI.

In performing the compression at Block 404, optionally at Block 410, the compression can be performed where a payload size of the set of CBs is at least a threshold payload size. In an aspect, compressing component 254, e.g., in conjunction with processor(s) 212, memory 216, transceiver 202, communicating component 242, etc., can perform the compression where the payload size of the set of CBs is at least the threshold payload size. For example, compressing component 254 can determine the threshold payload size from a configuration (e.g., as received from a base station 102 or other network component, etc.) or otherwise stored in a memory 216 of the UE 104 (e.g., based on implementation of the UE 104), where the threshold payload size may indicate a payload size of feedback values for which to perform compression. Thus, for example, compressing component 254 may not perform compression for all feedback values (e.g., where the payload size is less than the threshold).

In performing the compression at Block 404, optionally at Block 412, the compression can be performed where a prior compression of the multiple feedback values results in a prior compressed feedback value is greater than a maximum size. In an aspect, compressing component 254, e.g., in conjunction with processor(s) 212, memory 216, transceiver 202, communicating component 242, etc., can perform the compression where the prior compression of the feedback values results in a prior compressed feedback value that is greater than the maximum size. For example, using a compression method described above for a set of feedback values for CBs may result in a compressed feedback value that is of a size larger than a threshold (whether due to compressing more feedback values than expected, compressing more NACKs than expected, etc.). In this example, compressing component 254 can perform a second compression of the feedback values, which may be performed using a different type of compression, a different codebook, a different option for generating the binary map, a different level of CB grouping, etc. In addition, as described, the maximum compressed feedback value size can be indicated in a configuration received or determined by the UE 104 (e.g., as received at Block 402, etc.).

For example, where compressing component 254 performs the prior compression based on a first level of CB grouping (e.g., based on a first maximum number of CBGs), and the prior compressed feedback value resulting from the prior compression is greater than a maximum size, compressing component 254 can perform a second compression based on a second level of CB grouping (e.g., based on decreasing the maximum number of CBGs). For example, in decreasing the maximum number of CBGs, feedback component 252 can group feedback for more CBs into each CBG to reduce the total number of CBGs. In this example, compressing component 254 can compress the feedback for the reduced number of CBGs into the compressed feedback value. In an example, feedback component 252 and compressing component 254 can continue to decrease the maximum number of CBGs until the compressed feedback value is less than or equal to the maximum size. Once the compressed feedback value is less than or equal to the maximum size, feedback component 252 can transmit the compressed feedback (e.g., at Block 408).

In method 400, optionally at Block 414, an indication of one or more of a payload size of the set of CBs, a CBG size, or a size of the compressed feedback value can be transmitted. In an aspect, feedback component 252, e.g., in conjunction with processor(s) 212, memory 216, transceiver 202, communicating component 242, etc., can transmit the indication of one or more of the payload size (e.g., in bits) of the set of CBs (or TBs), a CBG size, which can include a CBG resolution (e.g., the number of CBs per CBG) or a maximum number of CBGs used in compressing the feedback value, or a size (e.g., payload size in bits) of the compressed feedback value. For example, feedback component 252 can transmit the indication of the CB/TB payload size, CBG size, payload size of the compressed feedback value, etc., along with the compressed feedback or in another transmission (e.g., to the base station 102) to assist in decompressing the compressed feedback value, as described herein.

FIG. 5 illustrates a flow chart of an example of a method 500 for decompressing feedback values for multiple CBs, in accordance with aspects described herein. In an example, a base station 102 can perform the functions described in method 500 using one or more of the components described in FIGS. 1 and 3.

In method 500, optionally at Block 502, a configuration including one or more parameters related to compressing feedback values for multiple CBs can be transmitted. In an aspect, compression configuring component 352, e.g., in conjunction with processor(s) 312, memory 316, transceiver 302, decompressing component 342, etc., can transmit (e.g., to a device, such as a UE 104), the configuration including the one or more parameters related to compressing the feedback values for multiple CBs. In an example, compression configuring component 352 can transmit the configuration in RRC layer signaling to the UE 104, in a MAC-CE, in dedicated control signaling (e.g., transmitted over PDCCH), and/or the like. For example, the configuration may indicate the one or more parameters related to performing compression, such as a compression method to use, which may include a lossless compression (e.g., Huffman coding, VLC, etc.), a codebook to use in performing the compression, a threshold payload size for which to perform compression of feedback values, a maximum compressed feedback value size, a CBG configuration for determining feedback values for CBGs, etc., as described. In one example, as described, the CBG configuration can indicate a maximum number of CBGs for which feedback can be reported. The UE 104 can use this information to determine how many CBs to include in a CBG.

In method 500, optionally at Block 504, a set of CBs can be transmitted to a UE. In an aspect, decompressing component 342, e.g., in conjunction with processor(s) 312, memory 316, transceiver 302, etc., can transmit the set of CBs to the UE (e.g., UE 104). For example, decompressing component 342 can transmit (e.g., along with other base stations 102 or otherwise) the set of CBs in multiple transmissions to the UE. In one example, decompressing component 342 can transmit the set of CBs using various antenna panels of the base station 102, TRPs associated with the base station 102, etc. In addition, for example, decompressing component 342 can transmit the set of CBs in each of multiple beams from one or more antenna panels or TRPs of the base station 102, etc. In any case, the UE 104 can determine feedback values related to receiving the set of CBs, as described herein, and can compress feedback bits into a compressed feedback value (e.g., using a lossless feedback mechanism) for optimized transmission of the feedback values.

In method 500, at Block 506, compressed feedback for a set of CBs can be received based on a compressed feedback value. In an aspect, decompressing component 342, e.g., in conjunction with processor(s) 312, memory 316, transceiver 302, etc., can receive the compressed feedback for the set of CBs based on the compressed feedback value. For example, decompressing component 342 can receive the compressed feedback in UCI from the UE 104, which may include receiving the compressed feedback value or another value computed or determined based on the compressed feedback value (or from which the compressed feedback value may be derived).

In method 500, at Block 508, a decompression of the compressed feedback value can be performed, based on a compression method and associated codebook, to obtain, for the set of CBs, multiple feedback values. In an aspect, decompressing component 342, e.g., in conjunction with processor(s) 312, memory 316, transceiver 302, etc., can perform, based on the compression method and the associated codebook, the decompression of the compressed feedback value to obtain, for the set of CBs, the multiple feedback values. For example, decompressing component 342 can select or otherwise determine the compression method or associated codebook based on the one or more parameters. For example, the one or more parameters transmitted in the configuration (e.g., at Block 502) may indicate the compression method or associated code book to use in compressing the feedback values (or may indicate parameters for determining the compression method or associated codebook). Accordingly, decompressing component 342 can determine the compression method or associated codebook based on the indicated parameters and/or based on additional parameters that may be received from the UE 104, as described further herein.

For example, decompressing component 342 can use the codebook to decompress the compressed feedback value according to the compression method, where the compression method and the codebook are known to the base station 102 and the UE 104 (e.g., via configuration, as described, or as implemented in the UE 104 and base station 102 based on a wireless communication technology, etc.). In the example of FIG. 7 described above, decompressing component 342 can receive the compressed feedback value as '00010000110' and can determine the feedback values as '00000100000001' by using the codebook to decompress the compressed feedback value. In addition, decompressing component 342 can determine the CBs and/or corresponding TBs to which the feedback relates based on additional information regarding the compressing, the option to use in generating the binary map (e.g., whether to use option 1 to generate a one-dimensional map or option 2 to generate a two-dimensional map, etc.). Decompressing component 342 can accordingly handle CBs (or CBGs) for which NACK is received, which can include retransmitting the CBs (or CBGs).

In method 500, optionally at Block 510, an indication of one or more of a payload size of the set of CBs, a CBG size, or a size of the compressed feedback values can be received. In an aspect, decompressing component 342, e.g., in conjunction with processor(s) 312, memory 316, transceiver 302, etc., can receive (e.g., from the UE 104) the indication of one or more of the payload size of the set of CBs (or TBs), the CBG size (e.g., CBG resolution or maximum number of CBGs used in compressing the feedback values), or the size (e.g., payload size) of the compressed feedback value. For example, decompressing component 342 can further decompress the compressed feedback value based on this information. In an example, the payload size may allow decompressing component 342 to verify correct decompressing of the compressed feedback value. The CBG size may allow decompressing component 342 to verify which CBG size the UE 104 used in determining feedback values. As described above, for example, it may be possible that the UE 104 decreased the maximum number of CBGs to lower the compressed feedback value to at or below a maximum size, and thus decompressing component 342 can determine which CBs are in which CBGs based on the CBG size for determining CBs to retransmit based on a NACK feedback value received for a CBG.

As described in the examples above, a new RRC configuration can be introduced and used to enable/disable HARQ compression along with compression parameters. For example, a base station 102 can generate and transmit the configuration to a UE 104 for use in compressing HARQ feedback. For example, the configuration may indicate a compression method (e.g., Huffman, VLC, etc.) along with associated codebooks (e.g. Huffman codebook), a threshold payload size (e.g., for performing the HARQ feedback compression), a compressed HARQ payload maximum size, a CBG configuration, etc., as described above. In performing compression, for example, a feedback component 252 may, if CBG is configured, produce CBG-based HARQ-ACK codebook, and a compressing component 254 may, if HARQ payload size (either CB or CBG based if configured by RRC) is above configured threshold, perform lossless compression. For example, compressing component 254 can perform compression per TTI in the HARQ codebook, or can compress the entire payload as a whole.

If or while resultant compressed HARQ payload is larger than a payload maximum size feedback component 252 and/or compressing component 254 can decrease CBG maximum number of groups iteratively until compressed HARQ payload is smaller than payload maximum size. For the case CBG is not configured, feedback component 252 can start with a maximum number of code block groups (e.g., 8) in grouping feedback for CBs. In an example, the compressed HARQ payload structure to be transmitted can include Part 1: fixed payload size, indicated the used CBG level (2 bits) and possibly the compressed HARQ payload length, and/or Part 2: HARQ payload size.

Figure 8:
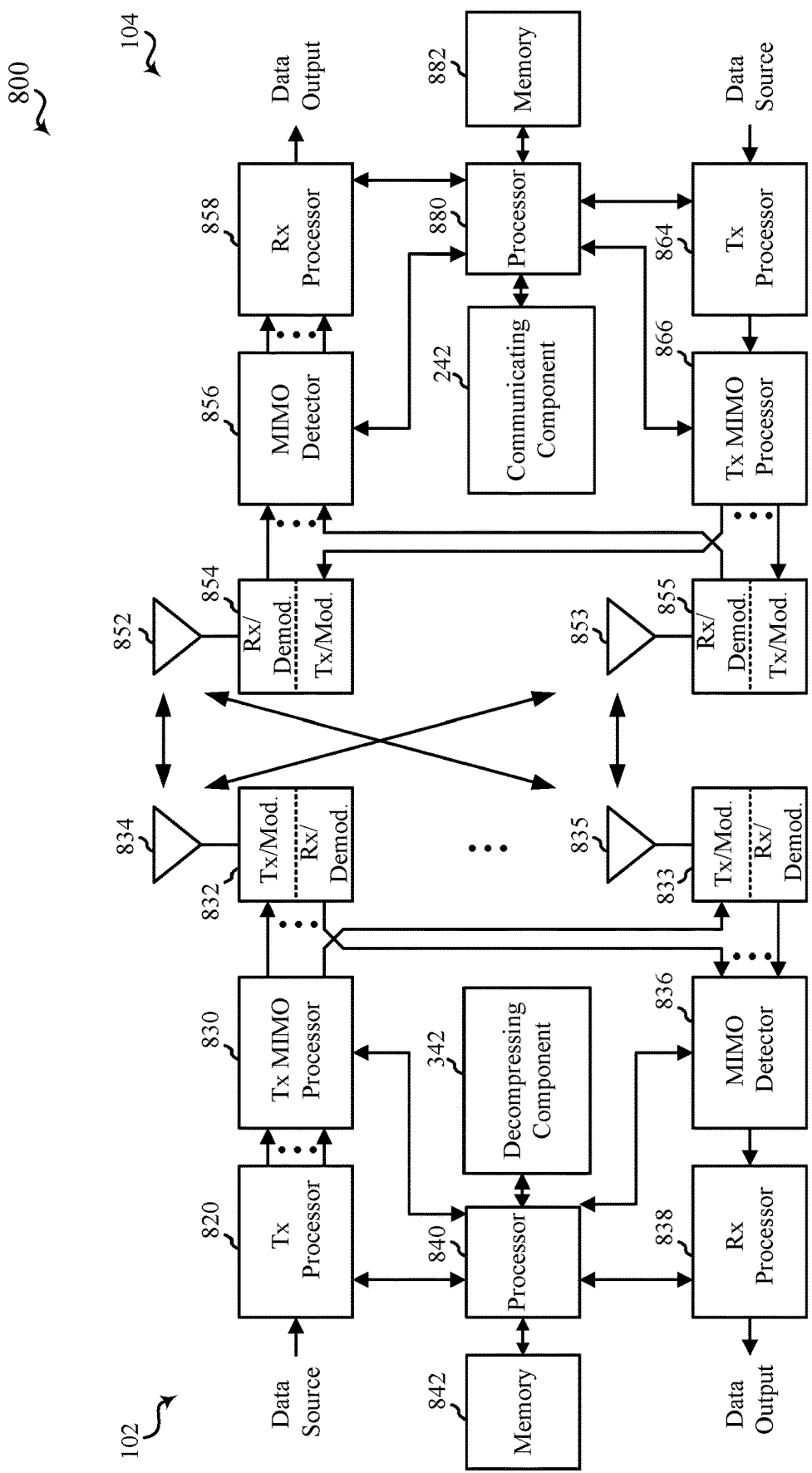
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a decompressing component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communications including receiving a configuration including one or more parameters related to compressing feedback values for multiple code blocks, performing, using a compression method and an associated codebook that are selected using the one or more parameters, a compression of multiple feedback values for a set of code blocks received from a network device into a compressed feedback value, and transmitting, to the network device and using the compressed feedback value, compressed feedback for the set of code blocks.

In Aspect 2, the method of Aspect 1 includes wherein performing the compression includes performing the compression where a payload size of the set of code blocks is at least a threshold payload size.

In Aspect 3, the method of Aspect 2 includes wherein the configuration indicates the threshold payload size for the compressing.

In Aspect 4, the method of any of Aspects 1 or 2 includes where the compressed feedback value is greater than a maximum compressed feedback value size, performing a second compression of the multiple feedback values into a second compressed feedback value, wherein transmitting the compressed feedback includes transmitting, to the network device, the second compressed feedback value.

In Aspect 5, the method of Aspect 4 includes wherein performing the second compression of the multiple feedback values includes performing, using the compression method and the associated codebook, the second compression of the compressed feedback value into the second compressed feedback value.

In Aspect 6, the method of Aspect 5 includes wherein performing the second compression of the compressed feedback value into the second compressed feedback value uses a reduced number of code block groups for which feedback values are compressed.

In Aspect 7, the method of any of Aspects 4 or 5 includes wherein the configuration indicates the maximum compressed feedback value size.

In Aspect 8, the method of any of Aspects 1 to 7 includes wherein performing the compression includes performing the compression of feedback values per code block group of code blocks in the set of code blocks, wherein the associated codebook corresponds to a size of the code block group.

In Aspect 9, the method of Aspect 8 includes wherein the configuration indicates to perform the compression of feedback values per code block group.

In Aspect 10, the method of any of Aspects 1 to 9 includes wherein performing the compression includes performing the compression of the feedback values per TTI using the associated codebook.

In Aspect 11, the method of any of Aspects 1 to 9 includes wherein performing the compression includes performing the compression of the feedback values per each code block in the set of code blocks, or per each code block group in the set of code blocks, using the associated codebook.

In Aspect 12, the method of any of Aspects 1 to 11 includes transmitting, to the network device, an indication of one or more of a payload size of the set of code blocks, a code block group size, or a size of the compressed feedback value.

In Aspect 13, the method of any of Aspects 1 to 12 includes transmitting, to the network device, an indication of a size of the multiple feedback values of the set of code blocks.

Aspect 14 is a method for wireless communications including transmitting a configuration including one or more parameters related to compressing feedback values for multiple code blocks, receiving, from a device, compressed feedback for a set of code blocks based on a compressed feedback value, and performing, based on a compression method and an associated codebook that are selected using the one or more parameters, a decompression of the compressed feedback value to obtain, for the set of code blocks, multiple feedback values.

In Aspect 15, the method of Aspect 14 includes wherein the configuration indicates a threshold payload size for the compressing.

In Aspect 16, the method of any of Aspects 14 or 15 includes wherein performing the decompression includes performing, using a code block group level of the compressed feedback value, multiple iterative decompressions of the compressed feedback value to obtain the multiple feedback values.

In Aspect 17, the method of Aspect 16 includes wherein the configuration indicates a maximum code block group level, and wherein performing the multiple iterative decompressions includes performing the multiple iterative decompressions where the code block group level of the compressed feedback is less than the maximum code block group level.

In Aspect 18, the method of any of Aspects 14 to 16 includes wherein the configuration indicates a maximum compressed feedback value size.

In Aspect 19, the method of any of Aspects 14 to 18 includes wherein performing the decompression includes performing the decompression of feedback values per code block group of code blocks in the set of code blocks, wherein the associated codebook corresponds to a size of the code block group.

In Aspect 20, the method of Aspect 19 includes wherein the configuration indicates to perform the compression of feedback values per code block group.

In Aspect 21, the method of any of Aspects 14 to 20 includes wherein performing the decompression includes performing the decompression of the feedback values per TTI using the associated codebook.

In Aspect 22, the method of any of Aspects 14 to 20 includes wherein performing the decompression includes performing the decompression of the feedback values per each code block in the set of code blocks, or per each code block group in the set of code blocks, using the associated codebook.

In Aspect 23, the method of any of Aspects 14 to 22 includes receiving, from the device, an indication of one or more of a payload size of the set of code blocks, a code block group size, or a size of the compressed feedback value.

In Aspect 24, the method of any of Aspects 14 to 23 includes receiving, from the device, an indication of a size of the multiple feedback values of the set of code blocks.

Aspect 25 is an apparatus for wireless communication including a transceiver, a memory configured to store instructions, and one or more processors communicatively coupled with the transceiver and the memory, wherein the one or more processors are configured to execute the instructions to perform the operations of one or more methods in Aspects 1 to 24.

Aspect 26 is an apparatus for wireless communication including means for performing the operations of one or more methods in any of Aspects 1 to 24.

Aspect 27 is a computer-readable medium including code executable by one or more processors to perform the operations of one or more methods in any of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the transceiver and the memory, wherein the one or more processors are configured to:
   receive a configuration including one or more parameters related to compressing feedback values for multiple code blocks;
   perform, using a compression method and an associated codebook that are selected using the one or more parameters, a compression of multiple feedback values for a set of code blocks received from a network device into a compressed feedback value based on a determination that a payload size of the set of code blocks is at least a threshold payload size, wherein the threshold payload size indicates a payload size of feedback values for which to perform compression, wherein the threshold payload size represents a threshold between performance of feedback value compression for payloads of at least the threshold payload size, and no performance of feedback value compression for payloads less than the threshold payload size; and
   transmit, to the network device and using the compressed feedback value, compressed feedback for the set of code blocks.

2. The apparatus of claim 1, wherein the one or more processors are configured to not perform the compression for the multiple feedback values based on a determination that the payload size of the set of code blocks is less than the threshold payload size.

3. The apparatus of claim 1, wherein the configuration is received from the network device, wherein the configuration indicates the threshold payload size for compressing the feedback values.

4. The apparatus of claim 1, wherein the one or more processors are configured to perform the compression of feedback values per code block group of code blocks in the set of code blocks, wherein the associated codebook corresponds to a size of the code block group.

5. The apparatus of claim 4, wherein the configuration indicates to perform the compression of feedback values per code block group.

6. The apparatus of claim 1, wherein the one or more processors are configured to perform the compression of the feedback values per transmission time interval (TTI) using the associated codebook.

7. The apparatus of claim 1, wherein the one or more processors are configured to perform the compression of the feedback values per each code block in the set of code blocks, or per each code block group in the set of code blocks, using the associated codebook.

8. The apparatus of claim 1, wherein the one or more processors are further configured to transmit, to the network device, an indication of one or more of the payload size of the set of code blocks, a code block group size, or a size of the compressed feedback value.

9. An apparatus for wireless communication, comprising:
   a transceiver;
   a memory configured to store instructions; and
   one or more processors communicatively coupled with the transceiver and the memory, wherein the one or more processors are configured to:
   receive a configuration including one or more parameters related to compressing feedback values for multiple code blocks;
   perform, using a compression method and an associated codebook that are selected using the one or more parameters, a compression of multiple feedback values for a set of code blocks received from a network device into a compressed feedback value based on a determination that a payload size of the set of code blocks is at least a threshold payload size, wherein the threshold payload size indicates a payload size of feedback values for which to perform compression, wherein the threshold payload size represents a threshold between performance of feedback value compression for payloads of at least the threshold payload size, and no performance of feedback value compression for payloads less than the threshold payload size;
   perform a second compression of the multiple feedback values into a second compressed feedback value based on a determination that the compressed feedback value is greater than a maximum compressed feedback value size; and transmit, to the network device and using the second compressed feedback value, compressed feedback for the set of code blocks.

10. The apparatus of claim 9, wherein the one or more processors are configured to perform the second compression of the multiple feedback values at least in part by performing, using the compression method and the associated codebook, the second compression of the compressed feedback value into the second compressed feedback value.

11. The apparatus of claim 10, wherein the one or more processors are configured to perform the second compression of the compressed feedback value into the second compressed feedback value using a reduced number of code block groups for which feedback values are compressed.

12. The apparatus of claim 9, wherein the configuration indicates the maximum compressed feedback value size.

13. An apparatus for wireless communication, comprising:
a transceiver;
a memory configured to store instructions; and
one or more processors communicatively coupled with the transceiver and the memory, wherein the one or more processors are configured to:
transmit, to a device, a configuration including one or more parameters related to compressing feedback values for multiple code blocks, wherein the configuration indicates a threshold payload size for a determination of whether to compress feedback values at the device, wherein the threshold payload size represents a threshold between performance of feedback value compression for payloads of at least the threshold payload size, and no performance of feedback value compression for payloads less than the threshold payload size;
receive, from the device, compressed feedback for a set of code blocks based on a compressed feedback value; and
perform, based on a compression method and an associated codebook that are selected using the one or more parameters, a decompression of the compressed feedback value to obtain, for the set of code blocks, multiple feedback values.

14. The apparatus of claim 13, wherein the one or more processors are configured to perform the decompression at least in part by being configured to perform, using a code block group level of the compressed feedback value, multiple iterative decompressions of the compressed feedback value to obtain the multiple feedback values.

15. The apparatus of claim 14, wherein the configuration indicates a maximum code block group level, and wherein the one or more processors are configured to perform the multiple iterative decompressions where the code block group level of the compressed feedback is less than the maximum code block group level.

16. The apparatus of claim 13, wherein the configuration indicates a maximum compressed feedback value size.

17. The apparatus of claim 13, wherein the one or more processors are configured to perform the decompression of feedback values per code block group of code blocks in the set of code blocks, wherein the associated codebook corresponds to a size of the code block group.

18. The apparatus of claim 17, wherein the configuration indicates to perform the compression of feedback values per code block group.

19. The apparatus of claim 13, wherein the one or more processors are configured to perform the decompression of the feedback values per transmission time interval (TTI) using the associated codebook.

20. The apparatus of claim 13, wherein the one or more processors are configured to perform the decompression of the feedback values per each code block in the set of code blocks, or per each code block group in the set of code blocks, using the associated codebook.

21. The apparatus of claim 13, wherein the one or more processors are further configured to receive, from the device, an indication of one or more of the payload size of the set of code blocks, a code block group size, or a size of the compressed feedback value.

22. A method for wireless communications, comprising:
receiving a configuration including one or more parameters related to compressing feedback values for multiple code blocks;
performing, using a compression method and an associated codebook that are selected using the one or more parameters, a compression of multiple feedback values for a set of code blocks received from a network device into a compressed feedback value based on a determination that a payload size of the set of code blocks is at least a threshold payload size, wherein the threshold payload size indicates a payload size of feedback values for which to perform compression, wherein the threshold payload size represents a threshold between performance of feedback value compression for payloads of at least the threshold payload size, and no performance of feedback value compression for payloads less than the threshold payload size; and
transmitting, to the network device and using the compressed feedback value, compressed feedback for the set of code blocks.

23. The method of claim 22, wherein the configuration is received from the network device, wherein the configuration indicates the threshold payload size for compressing the feedback values.

24. The method of claim 22, further comprising:
where the compressed feedback value is greater than a maximum compressed feedback value size, performing a second compression of the multiple feedback values into a second compressed feedback value,
wherein transmitting the compressed feedback includes transmitting, to the network device, the second compressed feedback value.

25. The method of claim 24, wherein performing the second compression of the multiple feedback values includes performing, using the compression method and the associated codebook, the second compression of the compressed feedback value into the second compressed feedback value.

26. The method of claim 25, wherein performing the second compression of the compressed feedback value into the second compressed feedback value uses a reduced number of code block groups for which feedback values are compressed.

27. A method for wireless communications, comprising:
transmitting, to a device, a configuration including one or more parameters related to compressing feedback values for multiple code blocks, wherein the configuration indicates a threshold payload size for a determination of whether to compress feedback values at the device, wherein the threshold payload size represents a threshold between performance of feedback value compression for payloads of at least the threshold payload size, and no performance of feedback value compression for payloads less than the threshold payload size;

receiving, from the device, compressed feedback for a set of code blocks based on a compressed feedback value; and performing, based on a compression method and an associated codebook that are selected using the one or more parameters, a decompression of the compressed feedback value to obtain, for the set of code blocks, multiple feedback values.

* * * * *